(12) United States Patent
Sano

(10) Patent No.: US 7,365,654 B2
(45) Date of Patent: Apr. 29, 2008

(54) ABSOLUTE ANGLE DETECTION APPARATUS

(75) Inventor: Tadashi Sano, Miyagi-ken (JP)

(73) Assignee: Alps Electric Co., Ltd, Tokyo (JP)

( * ) Notice: Subject to any disclaimer, the term of this patent is extended or adjusted under 35 U.S.C. 154(b) by 191 days.

(21) Appl. No.: 11/406,707

(22) Filed: Apr. 19, 2006

(65) Prior Publication Data

US 2006/0249665 A1 Nov. 9, 2006

(30) Foreign Application Priority Data

Apr. 22, 2005 (JP) ............................. 2005-125135
Apr. 22, 2005 (JP) ............................. 2005-125137

(51) Int. Cl.
*H03M 1/22* (2006.01)

(52) U.S. Cl. ............................................. 341/7; 341/3
(58) Field of Classification Search .................... 341/3, 341/9, 15, 7
See application file for complete search history.

(56) References Cited

U.S. PATENT DOCUMENTS 5,276,722 A * 1/1994 Aoki et al. .................... 377/49
5,901,003 A * 5/1999 Chainer et al. ................ 360/51
6,966,118 B2 * 11/2005 Sano ........................... 33/1 PT
2006/0169879 A1* 8/2006 Urakawa ................ 250/231.13

FOREIGN PATENT DOCUMENTS

JP 2000-028396 1/2000

* cited by examiner

*Primary Examiner*—Peguy JeanPierre
(74) *Attorney, Agent, or Firm*—Brinks Hofer Gilson & Lione

(57) ABSTRACT

In an absolute angle detection apparatus, sectors are obtained by dividing 360° by an even number, each sector having combinations of first and second code lines. The first code lines are Gray codes including third code lines that do not appear the same even when a digit from which they are read is changed and fourth code lines that appear the same when a digit from which they are read is changed. The first code lines at adjacent steps and the first code lines at the first and last steps differ from each other at one bit. Each first code line is shifted by one digit at every predetermined number of steps, and the first code line without shift is obtained when the first code line corresponding to the maximum shift is further shifted by one digit. The second code lines identify the fourth code lines.

8 Claims, 8 Drawing Sheets

| Sector | Code | | | | Sector ID Code |
|---|---|---|---|---|---|
| | 00 | 01 | 11 | 10 | 00100 / 10100 / 10101 |
| SECTOR 1 | | | | | 10111 |
| SECTOR 2 | | | | | 00111 |
| SECTOR 3 | | | | | 00110 |
| SECTOR 4 | | | | | 00010 |
| SECTOR 5 | | | | | 01010 |
| SECTOR 6 | | | | | 11010 |
| SECTOR 7 | | | | | 11011 |
| SECTOR 8 | | | | | 10011 |

| Sector | Code | | | | Sector ID Code |
|---|---|---|---|---|---|
| | 00 | 01 | 11 | 10 | |
| SECTOR 9 | | | | | 00011 |
| SECTOR 10 | | | | | 00001 |
| SECTOR 11 | | | | | 00101 |
| SECTOR 12 | | | | | 01101 |
| SECTOR 13 | | | | | 11101 |
| SECTOR 14 | | | | | 11001 |
| SECTOR 15 | | | | | 10001 |
| SECTOR 16 | | | | | 10000 |

| Sector | Code | | | | Sector ID Code |
|---|---|---|---|---|---|
| | 00 | 01 | 11 | 10 | |
| SECTOR 17 | | | | | 10010 |
| SECTOR 18 | | | | | 10110 |
| SECTOR 19 | | | | | 11110 |
| SECTOR 20 | | | | | 11100 |
| SECTOR 21 | | | | | 11000 |
| SECTOR 22 | | | | | 01000 |
| SECTOR 23 | | | | | 01001 |
| SECTOR 24 | | | | | 01011 / 01111 / 01110 / 01100 |

FIG. 9

| ANGLE | 6-BIT GRAY CODE |
|---|---|
| 0 | 0 0 0 1 0 0 |
| 1.5 | 0 1 0 1 0 0 |
| 3 | 1 1 0 1 0 0 |
| 4.5 | 1 0 0 1 0 0 |
| 6 | 1 0 1 1 0 0 |
| 7.5 | 1 0 1 1 1 0 |
| 9 | 1 0 1 1 1 1 |
| 10.5 | 0 0 1 1 1 1 |
| 12 | 0 0 0 1 1 1 |
| 13.5 | 1 0 0 1 1 1 |
| 15 | 1 0 0 0 1 1 |
| 16.5 | 0 0 0 0 1 0 |
| 18 | 0 1 1 0 1 0 |
| 19.5 | 0 1 0 0 1 0 |
| 21 | 0 1 0 1 1 0 |
| 22.5 | 0 1 0 1 1 1 |
| 24 | 1 1 0 1 1 1 |
| 25.5 | 1 0 0 1 1 1 |
| 27 | 1 0 0 0 1 1 |
| 28.5 | 1 0 0 0 0 1 |
| 30 | 0 0 0 0 0 1 |
| 31.5 | 0 0 0 1 0 1 |
| 33 | 0 0 1 1 0 1 |
| 34.5 | 0 0 1 1 1 1 |
| 36 | 0 0 1 1 1 1 |
| 37.5 | 1 0 1 0 1 1 |
| 39 | 1 1 1 0 1 1 |
| 40.5 | 1 1 0 0 1 1 |
| 42 | 1 1 0 0 0 1 |
| 43.5 | 1 1 1 0 0 0 |
| 45 | 1 0 1 0 0 0 |
| 46.5 | 1 0 0 0 0 0 |
| 48 | 1 0 0 1 1 0 |
| 49.5 | 1 0 0 1 0 0 |
| 51 | 1 0 0 1 0 1 |
| 52.5 | 1 1 0 1 0 1 |
| 54 | 1 1 1 1 0 1 |
| 55.5 | 1 1 1 0 0 1 |
| 57 | 1 1 1 0 0 0 |
| 58.5 | 0 1 1 0 0 0 |
| 60 | 0 1 0 0 0 0 |
| 61.5 | 0 1 0 0 0 1 |
| 63 | 0 1 0 0 1 1 |
| 64.5 | 0 1 0 1 1 1 |
| 66 | 1 1 0 1 1 0 |
| 67.5 | 1 1 1 1 1 0 |
| 69 | 1 1 1 1 1 1 |
| 70.5 | 1 1 1 1 0 1 |
| 72 | 0 1 1 1 0 0 |
| 73.5 | 0 0 1 1 0 0 |
| 75 | 1 0 1 1 0 0 |
| 76.5 | 1 0 1 0 0 1 |
| 78 | 1 0 1 0 0 1 |
| 79.5 | 0 0 1 0 0 1 |
| 81 | 0 1 1 0 0 1 |
| 82.5 | 0 1 0 0 0 1 |
| 84 | 0 1 0 0 1 1 |
| 85.5 | 0 1 0 0 1 0 |
| 87 | 0 1 0 1 1 0 |
| 88.5 | 0 0 0 1 1 0 |

| SECTOR | 2-BIT CODE | SECTOR ID CODE |
|---|---|---|
| | | 00100 |
| | | 10100 |
| | | 10101 |
| SECTOR 1 | 00 / 01 | 10111 |
| SECTOR 2 | 11 / 10 | 00111 |
| SECTOR 3 | 00 / 01 | 00110 |
| SECTOR 4 | 11 / 10 | 00010 |
| SECTOR 5 | 00 / 01 | 01010 |
| SECTOR 6 | 11 / 10 | 11010 |
| SECTOR 7 | 00 / 01 | 11011 |
| SECTOR 8 | 11 / 10 | 10011 |
| SECTOR 9 | 00 / 01 | 00011 |
| SECTOR 10 | 11 / 10 | 00001 |
| SECTOR 11 | 00 / 01 | 00101 |
| SECTOR 12 | 11 / 10 | 01101 |

| SECTOR | 2-BIT CODE | SECTOR ID CODE |
|---|---|---|
| SECTOR 13 | 00 / 01 | 11101 |
| SECTOR 14 | 11 / 10 | 11001 |
| SECTOR 15 | 00 / 01 | 10001 |
| SECTOR 16 | 11 / 10 | 10000 |
| SECTOR 17 | 00 / 01 | 10010 |
| SECTOR 18 | 11 / 10 | 10110 |
| SECTOR 19 | 00 / 01 | 11110 |
| SECTOR 20 | 11 / 10 | 11100 |
| SECTOR 21 | 00 / 01 | 11000 |
| SECTOR 22 | 11 / 10 | 01000 |
| SECTOR 23 | 00 / 01 | 01001 |
| SECTOR 24 | 11 / 10 | 01011 |
| | | 01111 |
| | | 01110 |
| | | 01100 |

ABSOLUTE ANGLE DETECTION APPARATUS

BACKGROUND OF THE INVENTION

1. Field of the Invention

The present invention relates to absolute angle detection apparatuses, and more particularly, to an absolute angle detection apparatus that detects an absolute angle of a rotating body using Gray codes.

2. Description of the Related Art

Vehicles having an absolute angle detection apparatus disposed between a steering shaft and a vehicle body are known. In such a vehicle, damping force control of a suspension, shift position control of an automatic transmission, rear-wheel steering control for four-wheel steering vehicles, etc., are performed on the basis of a steering angle, a steering speed, a steering direction, etc., of a steering wheel detected by the absolute angle detection apparatus.

Devices using binary coded decimal (BCD) codes, M-sequence codes, Gray codes, etc., are known as devices for detecting an absolute angle with a certain resolution. In particular, the device using Gray codes is advantageous in increasing the resolution since the Gray codes at the adjacent steps always differ from each other at only one bit and it is not necessary to use a reading timing pulse. Therefore, the device using the Gray codes is most commonly used.

In a typical absolute angle detection apparatus using Gray codes, code pattern lines corresponding to first to third digit lines are formed on a disc, and pickups 1 to 9 that function as detection elements are arranged so as to face the code pattern lines within an angular range of about 90°. Five-bit code elements supplied from the pickups 1 to 5 arranged so as to face the code pattern line corresponding to the first digit line are combined to obtain Gray codes of the first digit line with a resolution of 1.125° and a period of 22.5°. Two-bit code elements supplied from the pickups 6 and 7 arranged so as to face the code pattern line corresponding to the second digit line are combined to obtain Gray codes of the second digit line with a resolution of 22.5° and a period of 90°. Two-bit code elements supplied from the pickups 8 and 9 arranged so as to face the code pattern line corresponding to the third digit line are combined to obtain Gray codes of the third digit line with a resolution of 90° and a period of 360°. An example of such an absolute angle detection apparatus is disclosed in Japanese Unexamined Patent Application Publication No. 2000-28396 (FIGS. 1 to 4).

However, as is clear from FIGS. 2 to 4 of Japanese Unexamined Patent Application Publication No. 2000-28396, when, for example, a rotational angle of a disc 10 changes from 22.5° to 23.625°, the 9-bit code changes from (100010000) to (000010100). Thus, the 9-bit code changes at two bits at the switch position between periods of the Gray codes of each digit line. Therefore, if a signal phase shift occurs due to a physical cause, such as electrical or mechanical influence, at the switch position between the periods of each digit line, the digit lines cannot be identified and the rotational angle cannot be detected accurately.

SUMMARY OF THE INVENTION

To solve the above-described problem, an object of the present invention is to provide an absolute angle detection apparatus that can accurately detect a rotational angle even when a signal phase shift occurs due to a physical cause.

An absolute angle detection apparatus according to an embodiment of the present invention includes a first rotating disc retained by a rotating body; a first code pattern line and a second code pattern line provided along different circumferences on the first rotating disc; a first detection element group including a plurality of detection elements arranged so as to face the first code pattern line; a second detection element group including a plurality of detection elements arranged so as to face the second code pattern line; and a plurality of sectors assigned to the first rotating disc, each sector corresponding to an angle obtained by dividing 360° by an even number. Each of the sectors has combinations of first code lines and second code lines, each first code line including a set of code elements supplied from the first detection element group and each second code line including a set of code elements supplied from the second detection element group. The first code lines are Gray codes including third code lines that do not appear the same even when a digit from which the third code lines are read is changed and fourth code lines that appear the same when a digit from which the fourth code lines are read is changed. The first code lines at adjacent steps differ from each other at one bit and the first code lines at the first and last steps in each sector differ from each other at one bit. In each sector, each of the first code lines is shifted by one digit in a predetermined direction at every predetermined number of steps and the first code line corresponding to the maximum shift becomes identical to the first code line without shift when the first code line corresponding to the maximum shift is further shifted by one digit in the predetermined direction. The second code lines identify the fourth code lines.

The above-mentioned predetermined number is the quotient obtained by dividing the number of steps in each sector, that is, the number of first code lines included in each sector by the number of code elements included in each of the first code lines. More specifically, when the angle corresponding to one sector is B°, the desired resolution is b°, and the number of code elements included in the first code line at each step is n (even number), the number of steps in each sector is calculated as B/b and the predetermined number is calculated as the quotient B/(b×n) obtained by dividing the number of steps B/b by the number n of bits. In order for the Gray codes to show cyclicity, it is necessary that the number of steps in each sector B/b be an even number.

According to the above-described structure, the first code lines are Gray codes showing cyclicity in which the first code lines at the adjacent steps differ from each other at one bit in each sector and between the adjacent sectors. In addition, the angles corresponding to the identical fourth code lines included in the first code lines can be identified as different angles. Accordingly, even when a signal phase shift occurs due to a physical cause, the rotational angle can be detected with high accuracy.

In addition, since the first code lines show cyclicity over a plurality of sectors, with regard to the angular positional relationship between the detection elements included in the first detection element group and the first code pattern line, the detection elements of the first detection element group can be arranged at a constant angular interval along the first code pattern line. Thus, the detection elements can be easily positioned. Accordingly, the size of the absolute angle detection apparatus can be easily reduced and the resolution thereof can be easily increased. In addition, a table of the Gray codes can be easily provided and the cost of the absolute angle detection apparatus can be easily reduced.

In the absolute angle detection apparatus according to the present invention, preferably, the number of steps of the first code lines and the number of steps of the second code lines are even numbers, and when each of the sectors is evenly divided into n angular ranges, where n is a natural number of 2 or more, the fourth code lines are included in each of the angular ranges as identical code lines.

In such a case, the first code lines reliably show cyclicity. In addition, the identical fourth code lines are included in each of the n angular ranges into which each sector is divided, and these identical fourth code lines can be identified using different second code lines.

In the absolute angle detection apparatus according to the present invention, preferably, the number of detection elements included in the first detection element group is six, the number of detection elements included in the second detection element group is two, the third code lines are composed of nine kinds of code lines including (100000), (110000), (101000), (111000), (110100), (101100), (111100), (111010), and (111110), and the fourth code lines are composed of code lines in which the three bits on the front side are identical to the three bits on the back side. In addition, more preferably, the fourth code lines are composed of one of (100100) and (011011).

Accordingly, the number of identical fourth code lines and the number of second code lines can be reduced. In addition, since a small number of optical elements can be arranged in an angular range of 90° or less, the size and cost of the absolute angle detection apparatus can be reduced.

In the absolute angle detection apparatus according to the present invention, preferably, the second code lines are composed of cod lines selected from (00), (10), (01), and (11). In such a case, the second code lines form Gray codes.

The absolute angle detection apparatus according to the present invention may further include a second rotating disc that is provided on the rotating body with a speed reduction mechanism disposed therebetween and that is rotated at a reduced speed; a third code pattern line provided along a circumference on the second rotating disc; a third detection element group including a plurality of detection elements arranged so as to face the third code pattern line; and fifth code lines, each fifth code line including a set of code elements supplied from the third detection element group, the fifth code lines identifying the sectors corresponding to rotational angular ranges when the first rotating disc rotates over 360°.

In such a case, the rotational angle of the first rotating disc that rotates over 360° can be accurately detected without being influenced by backlash of the like that occurs in the mechanical structure of a speed reduction mechanism.

In the absolute angle detection apparatus according to the present invention, preferably, the fifth code lines are Gray codes, and the fifth code lines for the adjacent sectors differ from each other at one bit and the fifth code lines for the first and last codes differ from each other at one bit, and each of the fifth code lines is shifted by one digit in a predetermined direction at every predetermined number of steps and the first code line corresponding to the maximum shift becomes identical to the first code line without shift is further shifted by one digit in the predetermined direction.

According to the above-described structure, the fifth code lines show cyclicity over a plurality of sectors. Therefore, even when the switch position between the periods of the first and fifth code lines is shifted due to backlash or the like that occurs in the mechanical structure of the speed reduction mechanism, the validity of the combination of the first, second, and fifth code lines can be verified and the rotational angle can be accurately detected. In addition, since the fifth code lines show cyclicity over a plurality of sectors, with regard to the angular positional relationship between the detection elements included in the third detection element group and the third code pattern line, the detection elements can be arranged at a constant angular interval along the third code pattern line. Thus, the detection elements can be easily positioned. Accordingly, the size of the absolute angle detection apparatus can be easily reduced and the resolution thereof can be easily increased. In addition, a table of the Gray codes can be easily provided and the cost of the absolute angle detection apparatus can be easily reduced.

In the absolute angle detection apparatus according to the present invention, preferably, the number of detection elements included in the fifth detection element group is five, and the fifth code lines are composed of code lines selected from (10000), (11000), (10100), (11010), and (11110).

According to the above-described structure, the number of sectors corresponding to the rotational angle ranges of the first rotating disc can be increased and the rotational angle can be accurately detected even when the first rotating disc rotates over 360°.

BRIEF DESCRIPTION OF THE DRAWINGS

FIG. 2 is an example of a table of angle detection codes used in the absolute angle detection apparatus according to the first embodiment;

FIG. 8 is a table showing the correlation between Gray codes output from the absolute angle detection apparatus according to the second embodiment; and FIG. 9 is a table showing in detail the Gray codes output from the absolute angle detection apparatus according to the second embodiment.

DESCRIPTION OF THE PREFERRED EMBODIMENTS

Figure 1:
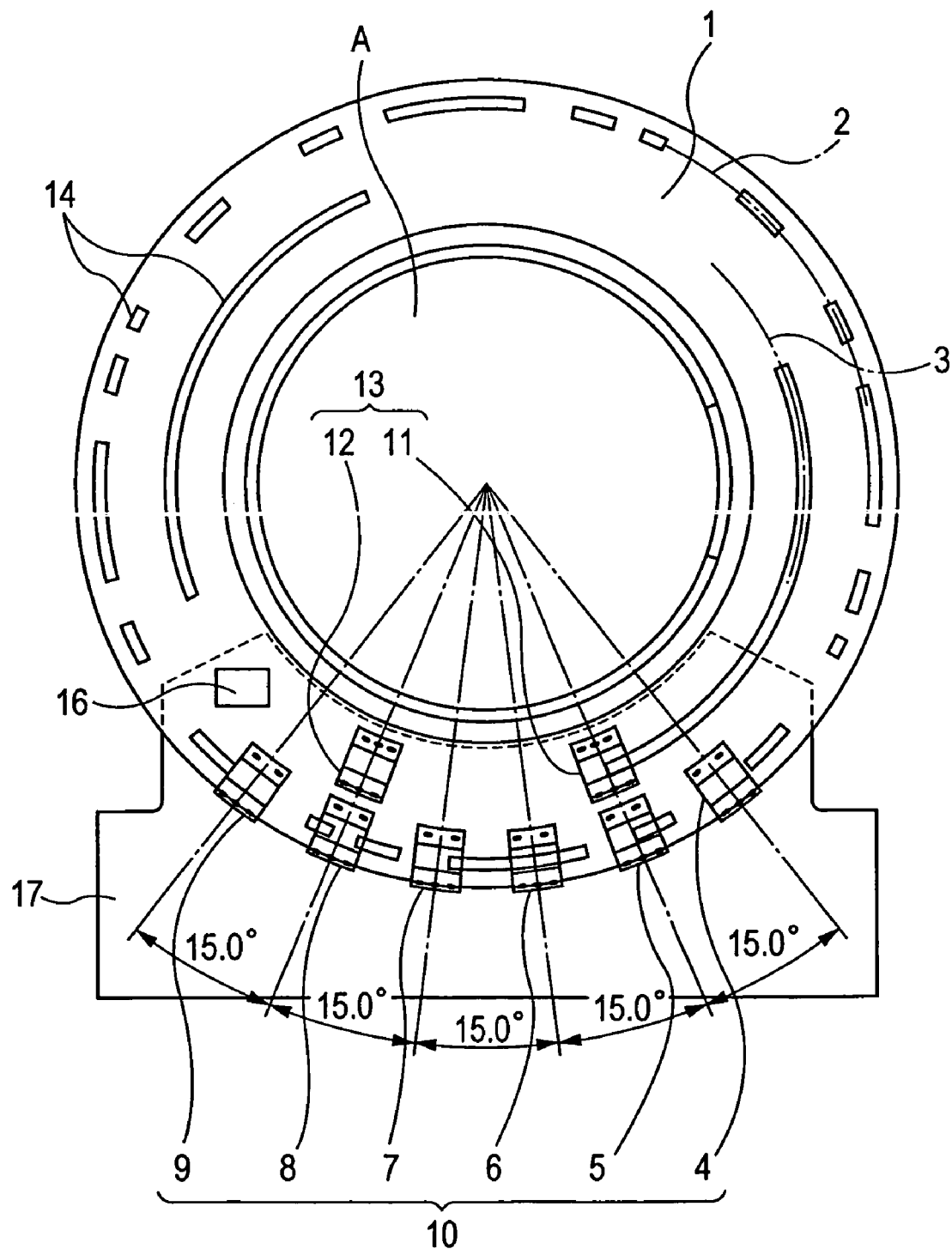
FIG. 1 is a front view illustrating the structure of a rotating disc and the arrangement of detection elements in an absolute angle detection apparatus according to a first embodiment of the present invention.

Referring to FIG. 1, an absolute angle detection apparatus according to a first embodiment of the present invention includes a first rotating disc 1 retained by a rotating body A. The first rotating disc 1 has a first code pattern line 2 and a second code pattern line 3 disposed along different concentric circumferences. A first detection element group 10 including detection elements 4 to 9 is disposed so as to face the first code pattern line 2, and a second detection element group 13 including detection elements 11 and 12 is disposed so as to face the second code pattern line 3. Four sectors, each of which corresponds to an angle range of 90° obtained by dividing 360° by an even number 4, are assigned to the rotating disc 1.

Each of the first code pattern line 2 and the second code pattern line 3 includes projections 14 that are provided on the rotating disc 1 so as to function as light-blocking plates.

Each of the detection elements 4 to 9 and the detection elements 11 and 12 includes a photointerrupter in which a light-emitting unit and a light-receiving unit are integrated together. Converting means 16 converts code elements obtained by the detection elements 4 to 9 and the detection elements 11 and 12 into a rotational angle of the rotating disc 1 within a range of 360° or less. The converting means 16 includes, for example, a semiconductor integrated circuit, and is provided on a circuit board 17.

Figure 2:
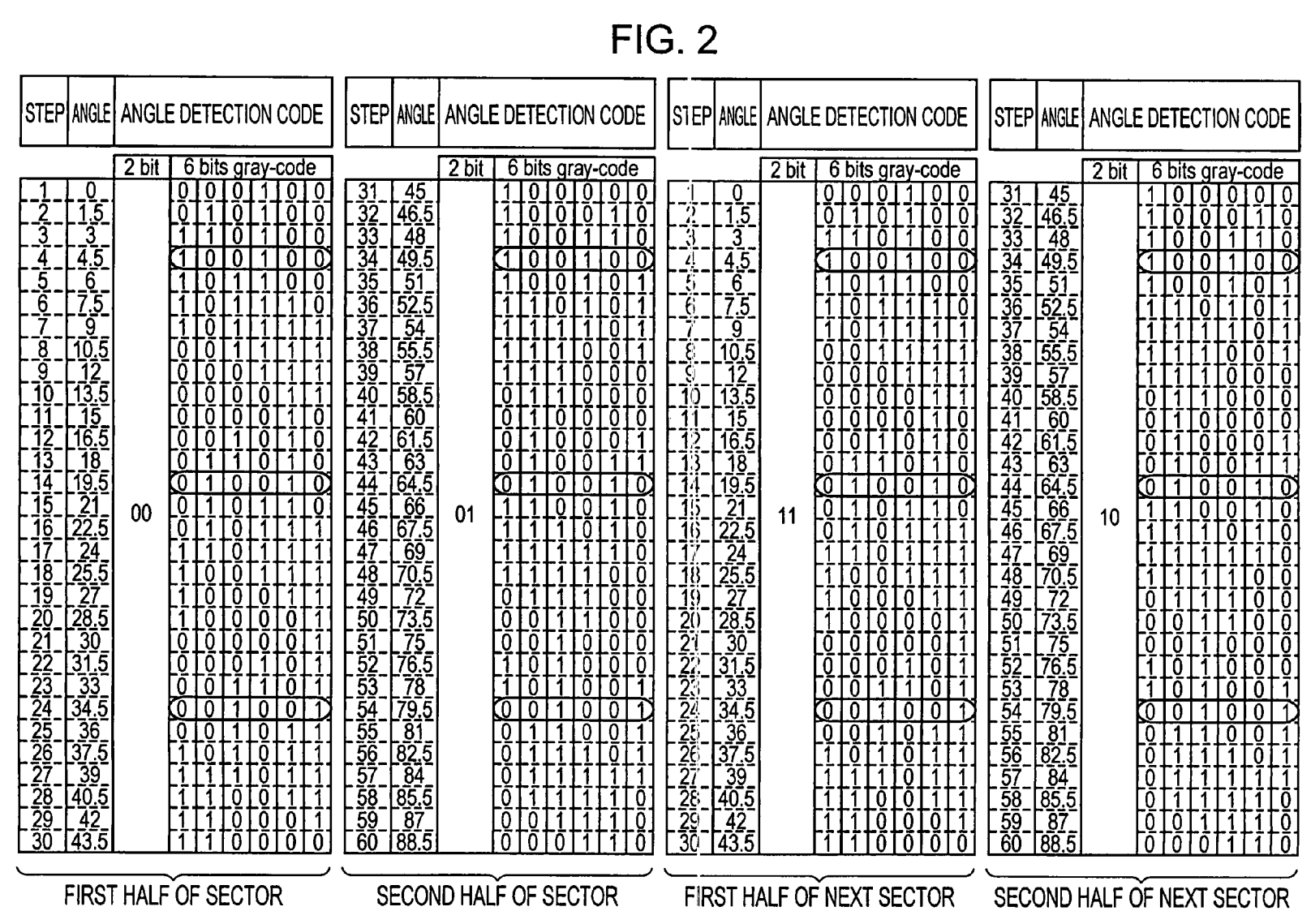

As shown in FIG. 1, the detection elements 4 to 9 are arranged within an angular range of 75° at a constant interval of 15°. The detection elements 11 and 12 are arranged such that the angle therebetween is 45°. The positional relationship between the detection elements 1 to 9 and the detection elements 11 and 12 is uniquely determined depending on the structure of angle detection codes according to the present invention that is shown in FIG. 2.

The angle detection codes will be described below with reference to FIG. 2.

Each of the four sectors assigned to the first rotating disc 1 has the angle detection codes of 60 steps (resolution 1.5°) defined by combinations of first code lines (6-bit Gray codes shown in FIG. 2) which each include a set of code elements supplied from the detection elements 4 to 9 and second code lines (2-bit codes shown in FIG. 2) which each include a set of code elements supplied from the detection elements 11 and 12.

The first code lines are Gray codes including third code lines that do not appear the same even when a digit from which the third code lines are read is changed and fourth code lines that appear the same when a digit from which the fourth code lines are read is changed. For example, in FIG. 2, the code lines at steps 1 to 3, steps 5 to 13, steps 15 to 23, steps 25 to 33, steps 35 to 43, steps 45 to 53, and steps 55 to 60 are the third code lines. At these steps, the third code lines are composed of nine kinds of code lines including (100000), (110000), (101000), (111000), (110100), (101100), (111100), (111010), and (111110).

In addition, in FIG. 2, the fourth code lines are (100100) at steps 4 and 34, (010010) at steps 14 and 44, and (001001) at steps 24 and 54. These fourth code lines are obtained by successively shifting a code line (100100) by one digit. The fourth code lines are 6-bit code lines in which the three bits on the front side are identical to the three bits on the back side, and code lines obtained by successively shifting (011011) by one digit may also be used as the fourth code lines.

According to the present invention, the first code lines at adjacent steps differ from each other at one bit and the first code lines at the first and last steps in each sector differ from each other at one bit. In addition, in each sector, each of the first code lines is shifted by one digit in a predetermined direction at every predetermined number of steps and the first code line corresponding to the maximum shift becomes identical to the first code line without shift when the first code line corresponding to the maximum shift is further shifted by one digit in the predetermined direction. For example, as is clear from FIG. 2, the first code lines at adjacent steps differ from each other at one bit. In addition, in the first sector, the first code line (000100) at the first step and the first code line (000110) at the last step differ from each other at one bit. In addition, the first code line (101111) at, for example, step 7 in the first sector is shifted rightward in FIG. 2 by one digit at every 10 steps. Then, when the first code line (011111) at step 57 that corresponds to the maximum shift of 50 steps is further shifted by one digit in the same direction, the first code line becomes identical to the first code line without shift, that is, the first code line (101111) at step 7, and to the first code line (101111) at step 7 in the next sector.

The above-mentioned predetermined number is the quotient obtained by dividing the number of steps in each sector, that is, the number of first code lines included in each sector by the number of code elements included in each of the first code lines. More specifically, when the angle corresponding to one sector is B°, the desired resolution is b°, and the number of code elements included in the first code line at each step is n (even number), the number of steps in each sector is calculated as B/b and the predetermined number is calculated as the quotient B/(b×n) obtained by dividing the number of steps B/b by the number n of code elements included in each first code line. In order for the Gray codes to show cyclicity, it is necessary that the number of steps in each sector B/b be an even number.

Since the first code lines are structured as described above, when a group of code lines corresponding to the predetermined number of steps is shifted together by one digit in the predetermined direction in each sector, a group of code lines identical to those of the adjacent group is obtained. This continues not only in one sector but over a plurality of sectors. For example, referring to FIG. 2, when a group of code lines corresponding to the above-described predetermined number of steps, that is, ten steps including steps 01 to 10 is shifted together by one digit toward the right, a group of code lines identical to those at steps 11 to 20 is obtained. Similarly, when a group of code lines at steps 11 to 20 is shifted together by one digit toward the right, a group of code lines identical to those at steps 21 to 30 is obtained. In addition, when a group of code lines at steps 51 to 60 is shifted together by one digit toward the right, a group of code lines identical to those at the first ten steps in the same sector and those at the first ten steps in the adjacent sector is obtained.

When the first code lines that form the Gray codes show cyclicity, the code lines at the adjacent steps differ from each other at one bit in each sector and between the adjacent sectors, so that the angle can be accurately detected by simple signal processing without using a timing pulse. Therefore, even when a signal phase shift occurs due to a physical cause, the rotational angle can be detected with high accuracy. Similarly, with regard to the angular positional relationship between the detection elements 4 to 9 included in the first detection element group 10 and the projections and spaces forming the first code pattern line 2, the detection elements 4 to 9 of the first detection element group 10 can be arranged at a constant angular interval along the first code pattern line 2. Thus, the detection elements 4 to 9 can be easily positioned. Accordingly, the size of the absolute angle detection apparatus can be easily reduced and the resolution thereof can be easily increased. In addition, a table of the Gray codes can be easily provided and the cost of the absolute angle detection apparatus can be easily reduced.

The second code lines (2-bit codes) according to the present invention are used for identifying the identical fourth code lines included in the first half and the second half of each sector. For example, in FIG. 2, the second code line (00) is combined with the first code lines at steps 1 to 30 in the first half of one sector and the second code line (01) is combined with the first code lines at steps 31 to 60 in the second half of that sector. Accordingly, it is determined that the fourth code line (100100) at step 4 in the first half of the sector corresponds to an angle of 4.5° and the fourth code line (100100) at step 34 in the second half of the sector corresponds to an angle of 49.5°. Similarly, the second code lines also identify the other identical fourth code lines (010010) and (001001) in the first and second halves of the sector so that they corresponding to different angles.

As described above, according to the present embodiment, the number of steps of the first code lines and the number of steps of the second code lines are even numbers. In addition, when each sector is evenly divided into n angular ranges (n is a natural number of 2 or more), the fourth code lines are included in each of the angular ranges as identical code lines.

According to the above-described structure, the first code lines reliably show cyclicity. In addition, the identical fourth code lines are included in each of the n angular ranges into which each sector is divided, and these identical fourth code lines can be identified using different second code lines.

In the first embodiment, the second code lines are composed of code lines selected from (00), (01), (10), and (11). However, although the second code lines may, of course, be formed using (0) and (1), other code lines may also be used depending on the resolution of the absolute angle detection apparatus, the number of sectors assigned to a single turn of the first rotating disc, the number of bits included in each of the first code lines, etc.

In the first code lines according to the present invention, the third code lines that do not appear the same even when a digit from which the third code lines are read is changed may also be composed of eight kinds of code lines selected from (100000), (110000), (101000), (111000), (110100), (101100), (111100), (111010), and (111110). However, nine kinds of code lines are preferably used since the Gray codes that form the first code lines can be easily obtained in such a case.

Next, a method of forming the first code lines (6-bit Gray codes) shown in FIG. 2 will be described below.

For example, when each sector corresponds to 90° and a resolution of 1.5° is to be obtained using six detection elements, 60-step Gray codes are required as the first code lines (6-bit Gray codes). In order to obtain 60-step Gray codes that show cyclicity as the first code lines, it is necessary that the number of code lines combined be an even number. When eight kinds of code lines are selected from nine kinds of code lines including (100000), (110000), (101000), (111000), (110100), (101100), (111100), (111010), and (111110), which do not appear the same even when a digit from which they are read is changed, the number of code lines that can be used is 48 (6×8) at a maximum. Therefore, 12 more code lines are necessary to obtain 60 steps and it is difficult to add other code lines to obtain first code lines that show cyclicity.

Accordingly, the above-mentioned nine kinds of code lines are used to obtain 54 (6×9) code lines (third code lines) at a maximum, and six more code lines (fourth code lines) that appear the same when a digit from which the code lines are read is changed are added. Thus, 60-step first code lines that show cyclicity can be easily obtained. For example, as the code lines that appear the same when a digit from which the code lines are read is changed, three code lines (100100), (010010), and (001001) obtained by successively shifting the code line (100100) by one digit may be used. These three code lines are added to each of the first and second halves of each sector, so that six code lines are added to each sector in total. Thus, 60-step first code lines that show cyclicity are obtained.

However, in the thus obtained first code lines that show cyclicity, rotational angles corresponding to the code lines (100100), (010010), and (001001) cannot be determined since they appear once in each of the first and second haves of each sector. Accordingly, the 2-bit code lines (second code lines) that differ from each other between the first and second haves of each sector are used in combination so that the rotational angles can be determined. More specifically, the first code lines, which are the Gray codes that show cyclicity, are combined with the 2-bit code (00) for the first half of one sector and with the 2-bit code (01) for the second half of that sector. Accordingly, with regard to the identical code lines (100100), it is determined that the fourth code line (100100) at step 4 corresponds to 4.5° and the fourth code line (100100) at step 34 corresponds to 49.5°. Similarly, with regard to the identical code lines (010010), it is determined that the fourth code line (010010) at step 14 corresponds to 19.5° and the fourth code line (010010) at step 44 corresponds to 64.5°. In addition, with regard to the identical code line (001001), it is determined that the fourth code line (001001) at step 24 corresponds to 34.5° and the fourth code line (001001) at step 54 corresponds to 79.5°.

When the angle detection codes are structured as shown in FIG. 2, the angle detection codes form Gray codes that show cyclicity in which the code lines at the adjacent steps differ from each other at one bit in each sector and between the adjacent sectors. Accordingly, the angle can be detected by simple signal processing without using a timing pulse. Therefore, even when a signal phase shift occurs due to a physical cause, the rotational angle can be detected with high accuracy. Similarly, with regard to the angular positional relationship between the detection elements 4 to 9 and the first code pattern line 2, in particular, the angular positional relationship between the detection elements 4 to 9 and the projections 14, the detection elements 4 to 9 can be arranged at a constant angular interval (15°) along the first code pattern line 2. Thus, the detection elements 4 to 9 can be easily positioned. Accordingly, the size of the absolute angle detection apparatus can be easily reduced and the resolution thereof can be easily increased. In addition, since the Gray codes show cyclicity, a table for angle detection can be easily provided and the cost of the absolute angle detection apparatus can be easily reduced.

In particular, in the absolute angle detection apparatus according to the present invention, the detection elements 4 to 9, 11, and 12 can be arranged in a small angular range within 75° or less in the case in which each sector corresponds to 90° and the resolution of 1.5° is provided with 60 steps. The detection elements 4 to 9 for obtaining the 6-bit Gray codes can be arranged at a constant angular interval of 15°, and accordingly a small, high-resolution absolute angle detection apparatus can be easily obtained.

Figure 3:
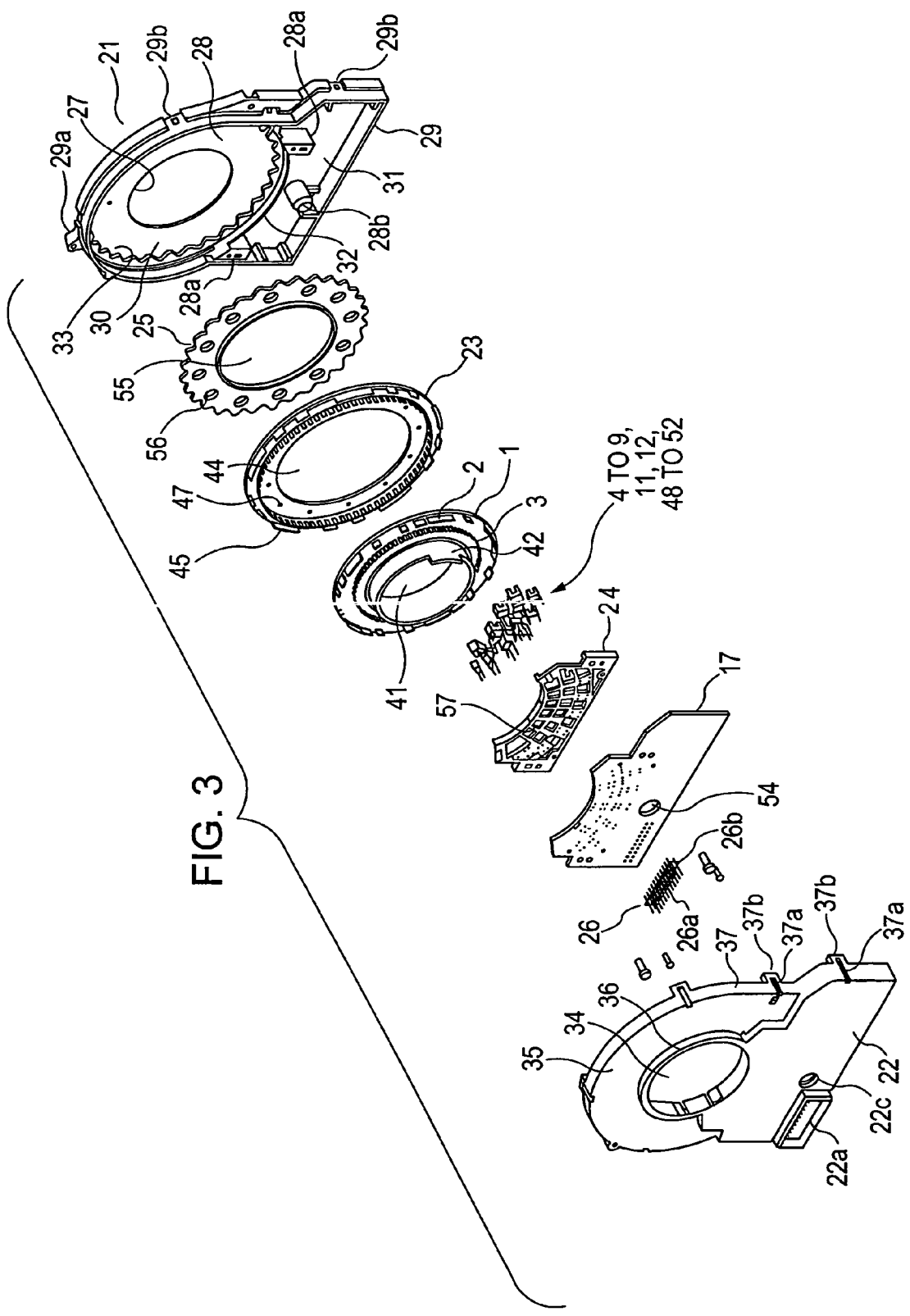
FIG. 3 is an exploded perspective view of an absolute angle detection apparatus according to a second embodiment of the present invention.
Figure 4:
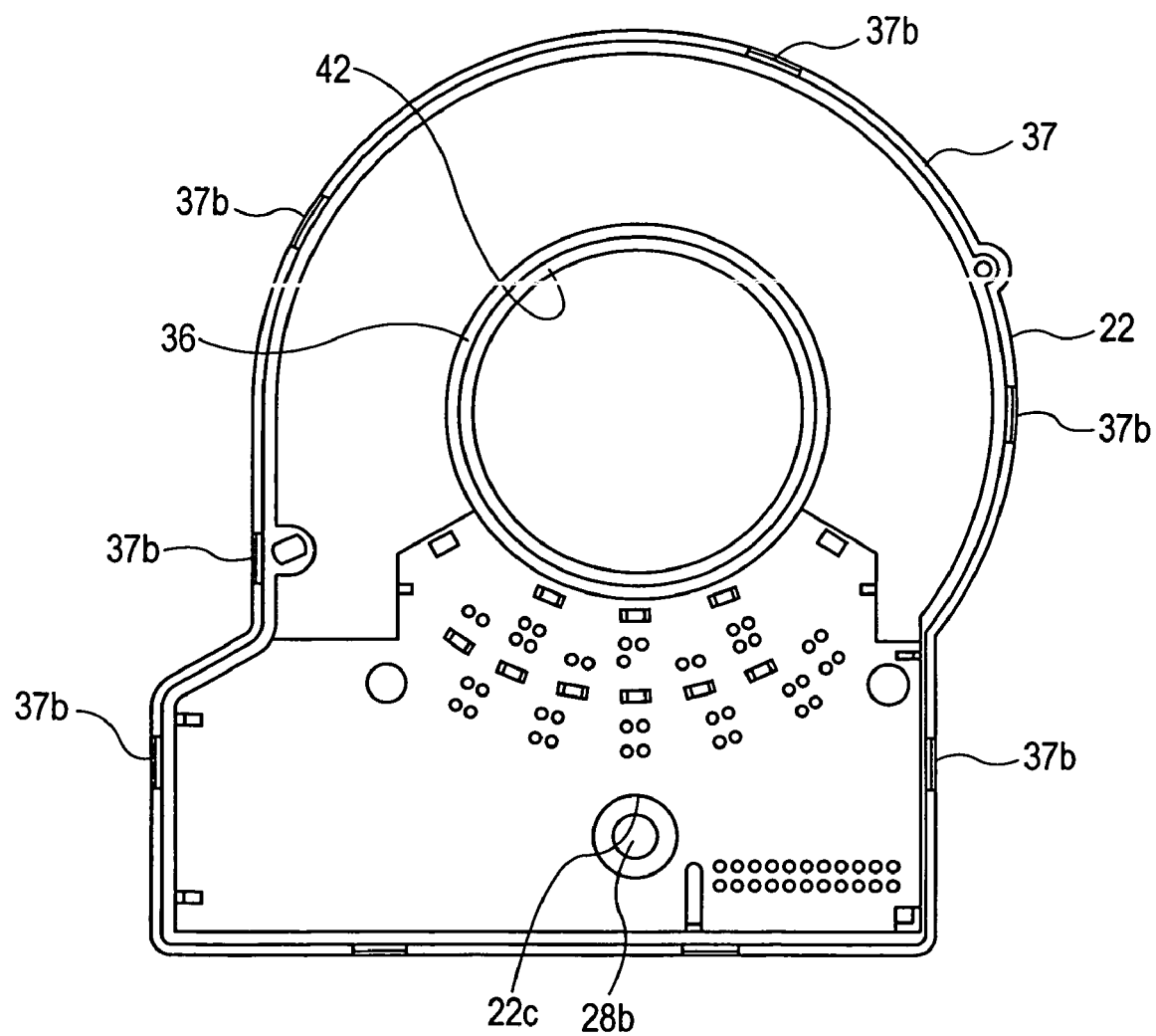
FIG. 4 is an internal view of a cover according to the second embodiment.
Figure 5:
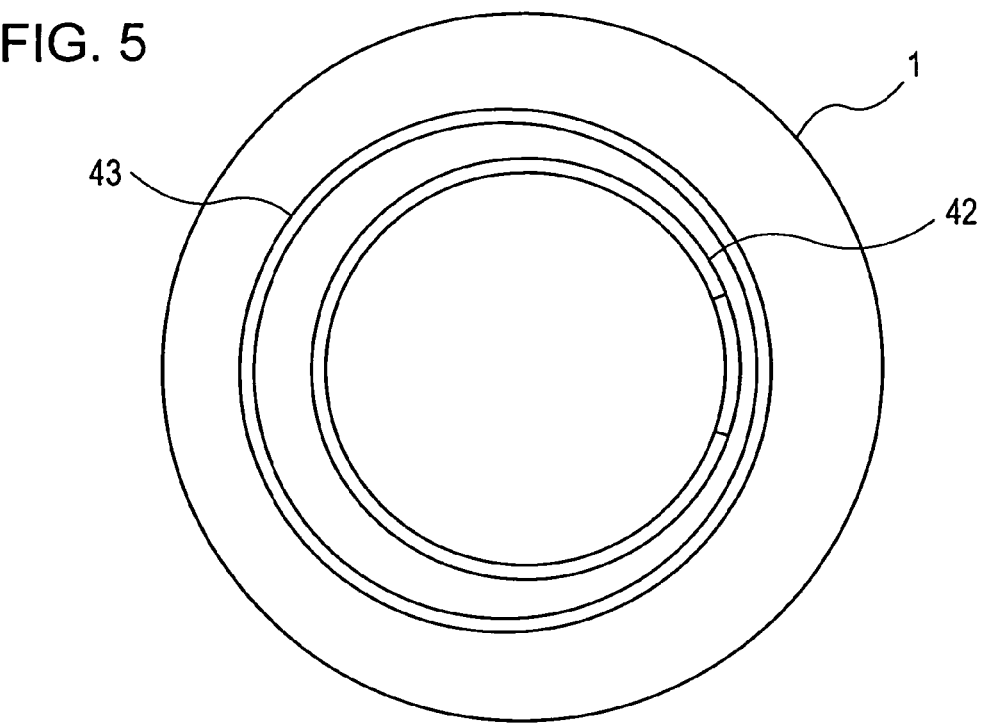
FIG. 5 is a rear view of a first rotating disc according to the second embodiment.
Figure 6:
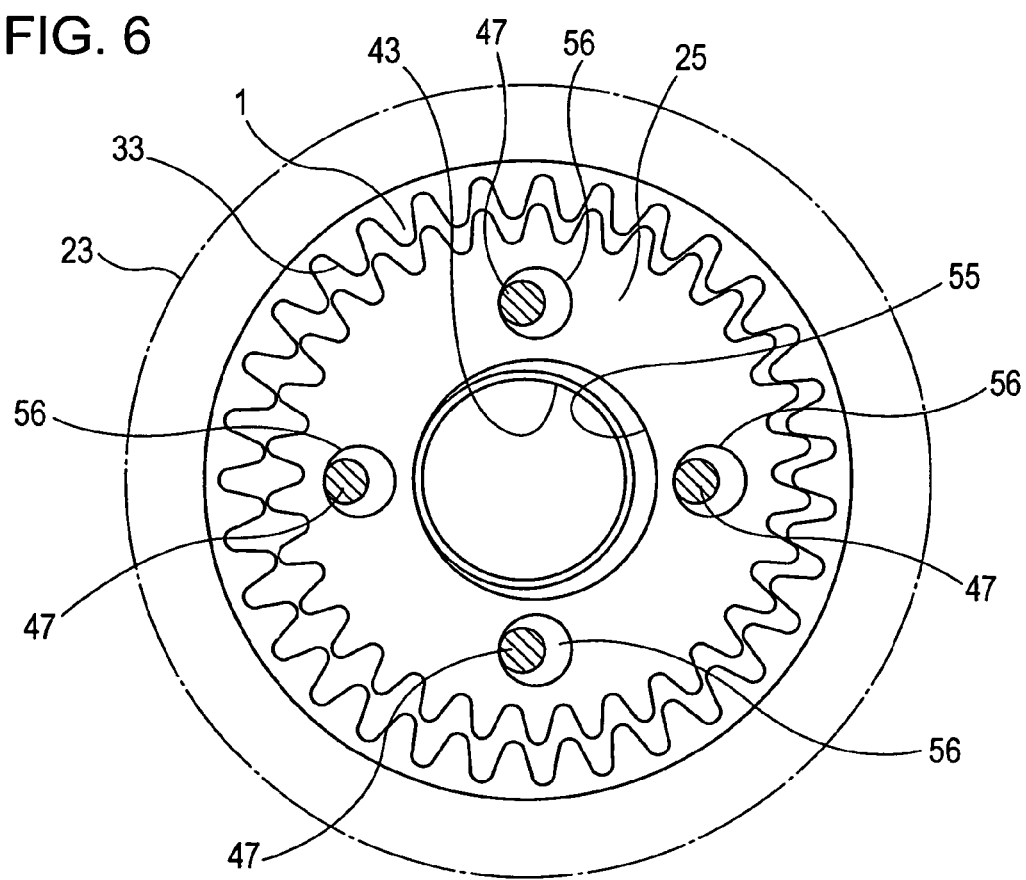
FIG. 6 is an internal view of a case illustrating the manner in which a planet gear, an internal gear, and a second rotating disc are connected to each other in the second embodiment.
Figure 7:
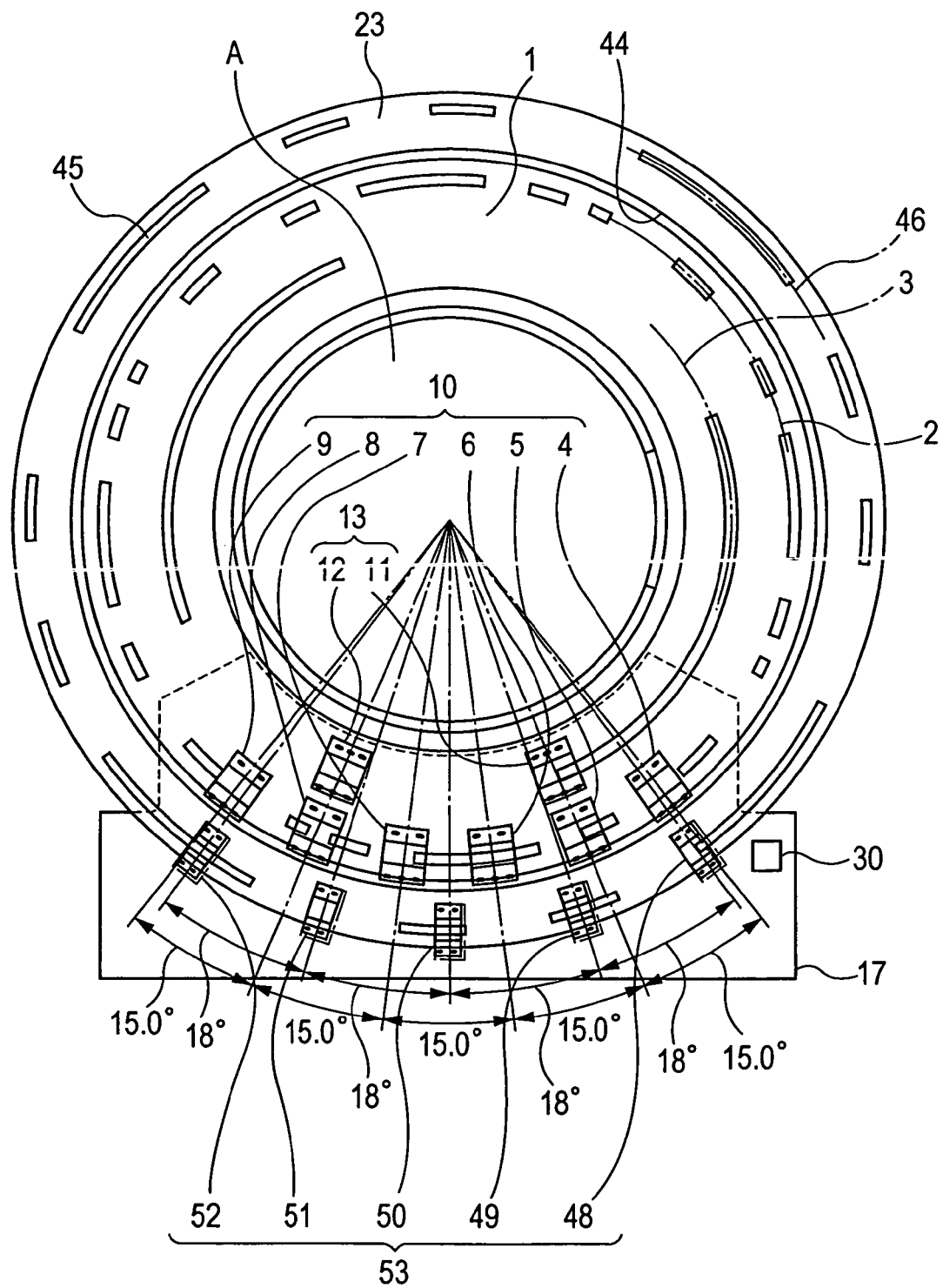
FIG. 7 is a diagram illustrating the manner in which the first rotating disc, the second rotating disc, and detection element groups are assembled in the second embodiment.

Next, an absolute angle detection apparatus that detects a rotational angle of a rotating disc that rotates in a range over 360° will be described below with reference to FIGS. 3 to 9 as a second embodiment of the present invention. FIG. 3 is an exploded perspective view of the absolute angle detection apparatus according to the second embodiment of the present invention. FIG. 4 is an internal view of a cover according to the second embodiment. FIG. 5 is a rear view of a first rotating disc according to the second embodiment. FIG. 6 is an internal view of a case illustrating the manner in which a planet gear, an internal gear, and a second rotating disc are connected to each other in the second embodiment. FIG. 7 is a diagram illustrating the manner in which the first rotating disc, the second rotating disc, and detection element groups are assembled in the second embodiment. FIG. 8 is a table showing the correlation between Gray codes output from the absolute angle detection apparatus according to the second embodiment. FIG. 9 is a table showing in detail the Gray codes output from the absolute angle detection apparatus according to the second embodiment.

The basic structure of a rotating disc 1 shown in FIG. 7 is similar to that of the first embodiment. Accordingly, similar components are denoted by the same reference numerals, and explanations thereof are thus omitted. In addition, the structures of the 2-bit code lines (second code lines) shown in FIGS. 8 and 9 that correspond to the first and second halves in each sector and the 6-bit Gray code lines (first code lines) that correspond to sector 1 shown in FIG. 9 are similar to those of the first embodiment, and explanations thereof are thus omitted.

As shown in FIG. 3, the absolute angle detection apparatus according to the present embodiment mainly includes a housing obtained by combining a case 21 and a cover 22; first and second rotating discs 1 and 23 that are rotatably stored in the housing, that can rotate with respect to each other, and that have principal surfaces on the same plane as shown in FIG. 7; a circuit board 17 provided on an inner side of the case 21; a signal-detection-element base 24 attached to the circuit board 17; thirteen detection elements 4 to 9, 11, 12, and 48 to 52 disposed on the signal-detection-element base 24 in a predetermined arrangement and having terminals that are electrically connected to terminals provided on the circuit board 17; converting means 30 that converts the code elements supplied from the detection elements 4 to 9, 11, 12, and 48 to 52 into the rotational angle of the first rotating disc 1; a planet gear 25 that is rotated by the first rotating disc 1 and that rotates the second rotating disc 23 at a rotational speed reduced at a predetermined reduction ratio; and a connector 26 that is attached to the circuit board 17 at one end and that faces a connector insertion hole 22a formed in the cover 22 at the other end.

The case 21 includes a bottom plate 28 having a center hole 27, a surrounding wall 29 that projects along the outer periphery of the bottom plate 28 at a constant height, and an arc-shaped partition wall 32 that projects at a position between a rotating-disc containing section 30 and a circuit-board containing section 31. An internal gear 33 that meshes with the planet gear 25 and that is concentric with the rotational axis of the rotating body (steering shaft), that is, with the center hole 27, is provided on the inner side of the rotating-disc containing section 30. In addition, circuit-board attaching bosses 28a for attaching the circuit board 17 with screws and a positioning projection 28b for positioning the cover 22 with respect to the case 21 are provided on the inner side of the bottom plate 28. A case attaching boss 29a for attaching the case 21 to a predetermined stator section, for example, a vehicle body, and retaining claws 29b for snap-fitting the cover 22 to the case 21 are provided on the outer side of the surrounding wall 29.

The cover 22 includes a top plate 35 having a center hole 34, a cylindrical guide member 36 that project outward along the inner periphery of the top plate 35, and a surrounding wall 37 that projects inward along the outer periphery of the top plate 35. The planar shape of the cover 22 is substantially the same as that of the case 21. The top plate 35 has a hole 22c to which the projection 28b is fitted.

The case 21 and the cover 22 are integrated by causing the retaining claws 29b provided on the case 21 to engage with engaging holes 37a formed in the cover 22. Thus, the housing for containing other components 1, 23, 25, etc., is obtained.

The first rotating disc 1 has a center hole 41 and a rotating-body connector 42 that has a cylindrical shape and that projects from the center hole 41. The first rotating disc 1 is fixed to a rotating body A (not shown), e.g., a steering shaft that extends through the center hole 41, and rotates together with the rotating body A by more than 360°. In addition, as shown in FIG. 5, a planet-gear attaching portion 43 having an annular shape for causing the planet gear 25 to rotate and revolve along the inner periphery of the internal gear 33 is provided on the rear side of the rotating disc 1 in such a manner that the planet-gear attaching portion 43 is decentered with respect to the rotational axis of the rotating body A (not shown).

The second rotating disc 23 has a center hole 44 that is concentric with the rotational axis of the rotating body A (not shown). A third code pattern line 46 including a plurality of projections 45 for signal detection that are disposed so as to project in a predetermined arrangement is formed on one side of the second rotating disc 23. In addition, as shown in FIG. 6, a plurality of engaging projections 47 for connecting the planet gear 25 are arranged at a constant interval on the rear side of the second rotating disc 23.

The detection elements 48 to 52 form a third detection element group 53 and are arranged so as to face the third code pattern line 46. Each of the detection elements 48 to 52 is composed of a photointerrupter in which a light-emitting unit and a light-receiving unit are integrated together.

The circuit board 17 is shaped such that the circuit board 17 can be placed in the circuit-board containing section 31 formed by the case 21 and the cover 22. A through hole 54 for allowing the positioning projection 28b on the case 21 to extend therethrough is formed at a predetermined position. In addition, a predetermined circuit pattern including terminals to which the terminals of the detection elements 4 to 9, 11, 12, and 48 to 52 and the connector 26 are electrically connected is formed on the surface of the circuit board 17.

As shown in FIG. 6, the planet gear 25 has a center hole 55 and a plurality of circular engagement holes 56 arranged around the center hole 55 at a constant interval. The planet-gear attaching portion 43 that is provided on the first rotating disc 1 so as to rotate eccentrically with respect to the rotational axis of the rotating body engages with the inner periphery of the center hole 55, and the engaging projections 47 provided on the rear side of the second rotating disc 23 engage with the engagement holes 56. Accordingly, when the first rotating disc 1 rotates, the planet-gear attaching portion 43 rotates while the planet-gear attaching portion 43 tightly engages with the central hole 55. Thus, the planet gear 25 rotates and revolves along the inner periphery of the internal gear 33 on the case 21 while meshing with the internal gear 33. The number of teeth of the planet gear 25 and that of the internal gear 33 are determined such that the rotational speed of the second rotating disc 23 is reduced with respect to that of the first rotating disc 1. For example, when the number of teeth of the internal gear 33 is set to 31 and the number of teeth of the planet gear 25 is set to 30, the reduction ratio of the rotational speed of the second rotating disc 23 to that of the first rotating disc 1 is set to 1/30. Thus, the second rotating disc 23 is arranged concentrically with respect to the rotational axis of the rotating body and functions as a rotation transmitting member that is rotated by the rotation of the planet gear 25 at a speed lower than that of the first rotating disc 1.

The connector 26 includes a predetermined number of connector pins 26a and a retaining member 26b made of insulating resin that retains the connector pins 26a in a predetermined arrangement. The connector pins 26a are connected to the circuit board 17 at one end thereof, and are arranged so as to face the connector insertion hole 22a formed in the cover 22 at the other end.

The signal-detection-element base 24 is used to place the detection elements 4 to 9, 11, 12, and 48 to 52 in a predetermined arrangement and includes detection element attachment portions 57 that are sectioned such that the detection elements 4 to 9, 11, 12, and 48 to 52 can be individually attached thereto. The signal-detection-element base 24 is attached to the circuit board 17 with screws.

As shown in FIG. 7, the third code pattern line 46 is provided on the second rotating disc 23. The third detection element group 53 including the detection elements 48 to 52 is disposed so as to face the third code pattern line 46. The detection elements 48 to 52 are arranged at a constant interval of 18° within an angular range of 72° in which the first detection element group 10 is disposed. The positional relationship between the detection elements 48 to 52 is uniquely determined depending on fifth code lines, which are sector-identifying codes shown in FIGS. 8 and 9.

Next, the fifth code lines will be described below with reference to FIGS. 8 and 9.

The fifth code lines (sector-identifying codes) include sets of code elements supplied from the five detection elements included in the third detection element group 53, and identify sectors 1 to 24 that correspond to rotational angle ranges of ±3 turns of the rotating disc 1. The fifth code lines are Gray codes with a resolution of 90° and are composed of code lines selected from (10000), (11000), (10100), (11010), and (11110). The fifth code lines for the adjacent sectors among sectors 1 to 24 differ from each other at one bit, and the first and last codes of the fifth code lines differ from each other at one bit. For example, as is clear from FIG. 9, the fifth code lines for the adjacent sectors differ from each other at one bit, and the fifth code (00100) line for the first sector and the fifth code line (01100) for the last sector differ from each other at one bit.

According to the above-described structure, the fifth code lines show cyclicity over a plurality of sectors. Therefore, even when the switch position between the periods of the first and fifth code lines is shifted due to backlash or the like that occurs in the mechanical structure of the speed reduction mechanism, the validity of the combination of the first, second, and fifth code lines can be verified. Accordingly, the rotational angle of the rotating disc 1 over 360° can be accurately detected.

For example, the fifth code lines that identify sectors 1 to 24 are Gray codes in which the code lines at the adjacent steps differ from each other at one bit. Therefore, when the fifth code lines are combined with the first code lines (6-bit Gray codes) for angle detection that show cyclicity and the second code lines (2-bit Gray codes) for identifying the first and second halves of each sector, not only the rotational angle in one sector but the rotational angle in the first half of the sector adjacent that sector on one side and the rotational angle in the second half of the sector adjacent that sector on the other side can be accurately detected. Accordingly, even when, for example, the detection timing in each sector is shifted due to the influence of backlash or the like that occurs in the mechanical structure of the speed reduction mechanism, the rotational angle of the rotating body can be accurately detected. As an example, a case is considered in which a code line output as the 6-bit Gray code for angle detection is (001001), which corresponds to the absolute angle of 34.5° or 79.5°, a code line output as the 2-bit Gray code for identifying the first and second halves in each sector is (11), which corresponds to the first half of a sector with an even number, and a code line output as the 5-bit Gray code for sector detection is (10001), with corresponds to sector 15. In this case, the code line (11) that corresponds to the first half of a sector with an even number is not normally output for sector 15 as the 2-bit Gray code for identifying the first and second halves in each sector. In addition, the code line (10001) that corresponds to sector 15 cannot be output for the first half of sector 14. Therefore, it can be determined that the accurate rotational angle is 34.5° in sector 16.

Therefore, in the absolute angle detection apparatus according to the present embodiment, even when the detection timing in each sector is shifted due to the influence of backlash or the like of the planet gear 25, the rotational angle of the rotating body that rotates over 360° can be accurately detected. Thus, the reliability of the absolute angle detection apparatus including a hypocycloid mechanism as a speed reduction mechanism can be increased. In addition, since the Gray code lines in which the code lines at the adjacent steps differ from each other at one bit are used, it is not necessary to use a timing pulse. In addition, since each sector corresponds to an angle of 90°, which is obtained by dividing 360° by an even number, signal processing performed by a control unit can be facilitated.

In addition, the fifth code lines show cyclicity over a plurality of sectors. Therefore, with regard to the angular positional relationship between the detection elements included in the third detection element group and the third code pattern line, the detection elements 48 to 52 of the third detection element group 53 can be arranged at a constant angular interval along the third code pattern line, as shown in FIG. 7. Thus, the detection elements 48 to 52 can be easily positioned. Accordingly, the size of the absolute angle detection apparatus can be easily reduced and the resolution thereof can be easily increased. In addition, in the absolute angle detection apparatus according to the second embodiment, all of the first, second, and fifth code lines are Gray codes. Therefore, the table can be easily provided and the cost of the absolute angle detection apparatus can be easily reduced. However, the fifth code lines, of course, may also be formed as code lines other than the Gray codes, and may be set arbitrarily in accordance with the rotational angle range of the rotating disc 1 and the number of sectors corresponding to the rotational angle range.

In addition, in the above-described embodiments, the signal detection system including the light-blocking plates and the photointerrupters is used. However, the present invention is not limited to this, and a combination of optical patterns, such as through holes and cutouts, and photointerrupters, a combination of magnetic patterns and magnetic detection elements, a combination of resistor patterns and collecting brushes, etc., may also be used.

What is claimed is:

1. An absolute angle detection apparatus comprising:
a first rotating disc retained by a rotating body;
a first code pattern line and a second code pattern line provided along different circumferences on the first rotating disc;
a first detection element group including a plurality of detection elements arranged so as to face the first code pattern line;
a second detection element group including a plurality of detection elements arranged so as to face the second code pattern line; and
a plurality of sectors assigned to the first rotating disc, each sector corresponding to an angle obtained by dividing 360° by an even number,
wherein each of the sectors has combinations of first code lines and second code lines, each first code line including a set of code elements supplied from the first detection element group and each second code line including a set of code elements supplied from the second detection element group, wherein the first code lines are Gray codes including third code lines that do not appear the same even when a digit from which the third code lines are read is changed and fourth code lines that appear the same when a digit from which the fourth code lines are read is changed, wherein the first code lines at adjacent steps differ from each other at one bit and the first code lines at the first and last steps in each sector differ from each other at one bit, wherein, in each sector, each of the first code lines is shifted by one digit in a predetermined direction at every predetermined number of steps and the first code line corresponding to the maximum shift becomes identical to the first code line without shift when the first code line corresponding to the maximum shift is further shifted by one digit in the predetermined direction, and wherein the second code lines identify the fourth code lines.

2. The absolute angle detection apparatus according to claim 1, wherein the number of steps of the first code lines and the number of steps of the second code lines are even numbers, and wherein when each of the sectors is evenly divided into n angular ranges, where n is a natural number of 2 or more, the fourth code lines are included in each of the angular ranges as identical code lines.

3. The absolute angle detection apparatus according to claim 2, wherein the number of detection elements included in the first detection element group is six and the number of detection elements included in the second detection element group is two, and wherein the third code lines are composed of nine kinds of code lines including (100000), (110000), (101000), (111000), (110100), (101100), (111100), (111010), and (111110) and the fourth code lines are composed of code lines in which the three bits on the front side are identical to the three bits on the back side.

4. The absolute angle detection apparatus according to claim 3, wherein the fourth code lines are composed of one of (100100) and (011011).

5. The absolute angle detection apparatus according to claim 4, wherein the second code lines are composed of code lines selected from (00), (10), (01), and (11).

6. The absolute angle detection apparatus according to claim 1, further comprising:

a second rotating disc that is provided on the rotating body with a speed reduction mechanism disposed therebetween and that is rotated at a reduced speed;

a third code pattern line provided along a circumference on the second rotating disc;

a third detection element group including a plurality of detection elements arranged so as to face the third code pattern line; and fifth code lines, each fifth code line including a set of code elements supplied from the third detection element group, wherein the fifth code lines identify the sectors corresponding to rotational angular ranges when the first rotating disc rotates over 360°.

7. The absolute angle detection apparatus according to claim 6, wherein the fifth code lines are Gray codes, and wherein the fifth code lines for the adjacent sectors differ from each other at one bit and the fifth code lines for the first and last codes differ from each other at one bit, and each of the fifth code lines is shifted by one digit in a predetermined direction at every predetermined number of steps and the first code line corresponding to the maximum shift becomes identical to the first code line without shift is further shifted by one digit in the predetermined direction.

8. The absolute angle detection apparatus according to claim 6, wherein the number of detection elements included in the fifth detection element group is five, and wherein the fifth code lines are composed of code lines selected from (10000), (11000), (10100), (11010), and (11110).

* * * * *